Figure 1:
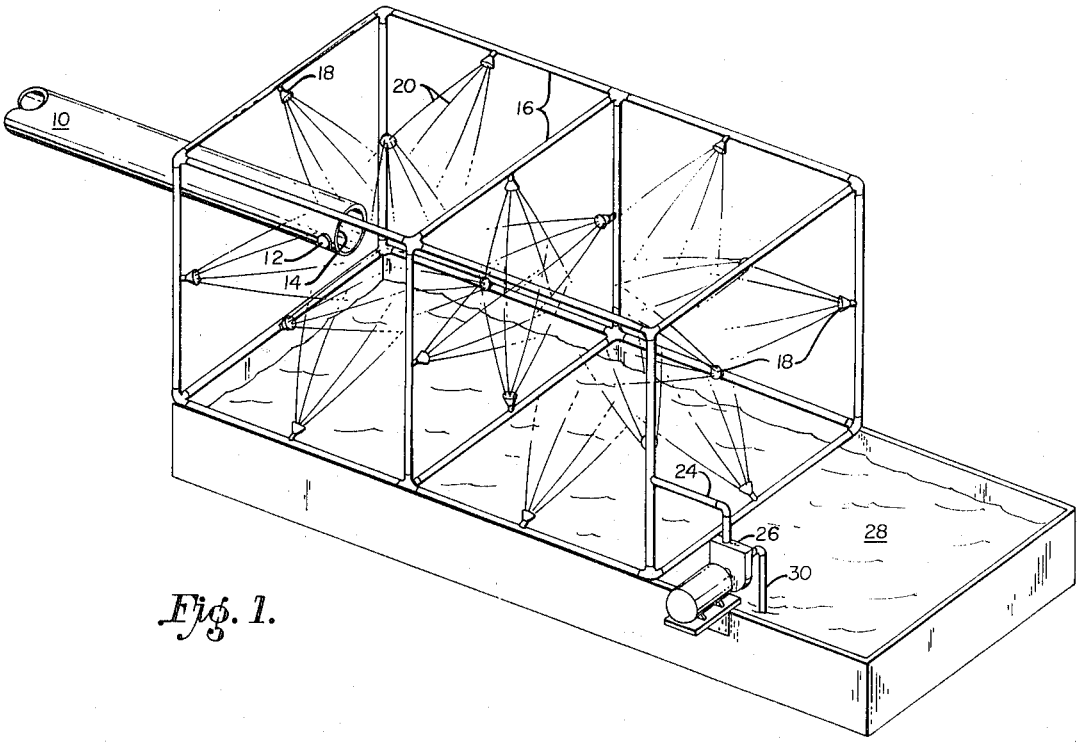
Figure 2:
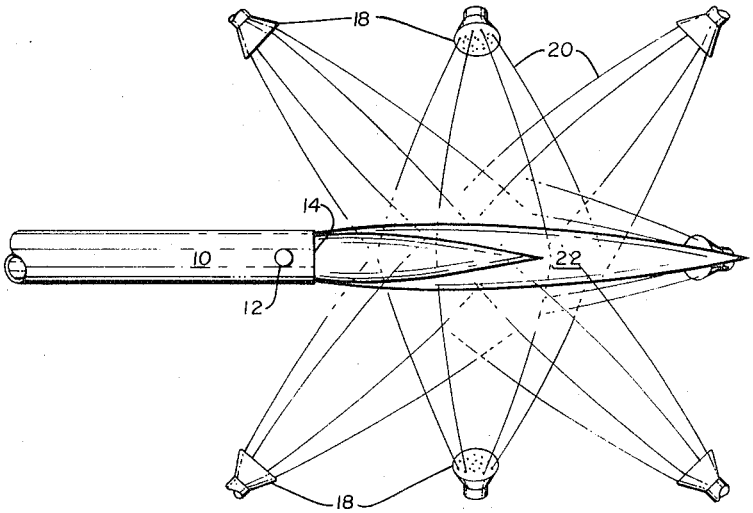

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 18, 1972

900 O.G. 817

T900,004
SMOKE SUPPRESSOR

William H. Lauderback, 112 W. Edgefield,
Longview, Tex. 75601

Filed Mar. 22, 1971, Ser. No. 126,783
**Int. Cl. F27b *9/00***
U.S. Cl. 23—2 C
1 Sheet Drawing. 9 Pages Specification

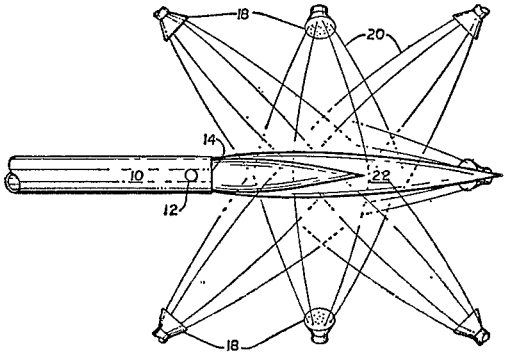

Method and apparatus for eliminating visible by-products occurring during open-air burning of combustible materials such as gaseous hydrocarbons in a flare wherein the flame is contacted with a water spray in the form of a fog or fine droplets which envelopes the flame. The amount of water used depends upon factors such as the size of the flare, the amount of material burned, the composition of the material burned and the configuration of the spray heads. The minimum water requirement is that necessary to produce a completely enveloping fog or mist and the maximum is less than that much would extinguish the flame.

July 18, 1972 W. H. LAUDERBACK T900,004

SMOKE SUPPRESSOR

Filed March 22, 1971

WILLIAM H. LAUDERBACK
INVENTOR

BY Earl D. Gustafson
Edward R. Weber
ATTORNEY